Oct. 6, 1959  C. VAN DER LELY ET AL  2,907,498
DISPENSING DEVICE

Filed Oct. 19, 1954  5 Sheets-Sheet 2

Oct. 6, 1959   C. VAN DER LELY ET AL   2,907,498
DISPENSING DEVICE
Filed Oct. 19, 1954   5 Sheets-Sheet 3

United States Patent Office 2,907,498
Patented Oct. 6, 1959

2,907,498

DISPENSING DEVICE

Cornelis van der Lely and Ary van der Lely, Maasland, Netherlands, assignors to C. van der Lely N.V., Maasland, Netherlands, a Dutch limited company Application October 19, 1954, Serial No. 463,212

Claims priority, application Netherlands October 22, 1953

4 Claims. (Cl. 222—199)

This invention relates to material dispensers, and more particularly to devices for dispensing materials of a powdery or granular nature.

Known devices of this kind are generally provided with scrapers mounted on conveying devices such as chains or the like.

It is an object of the invention to provide an improved dispensing device working on principles different from that indicated above.

A further object of the invention is to provide a dispensing device having an improved efficiency of operation.

Still another object of the invention is to provide a dispensing device which is economical to use and manufacture and which is, at the same time a convenient and accurate dispenser of powdery or granular materials.

To achieve the above and other objects, the invention contemplates, in accordance with one embodiment thereof, the provision of a hopper having a movable bottom defining a discharge opening. A slide is movably mounted adjacent the hopper to assist in varying the size of the discharge opening and means are provided to oscillate either or both of the bottom and the slide members whereby the relative motions therebetween described a closed line such as, for example, a circle. This structure can be varied as will be described below.

Moreover, other objects, features and details of present invention will appear in the following description with reference to the accompanying drawings in which some preferred embodiments of the invention are illustrated by way of example and in which.

Figure 3:
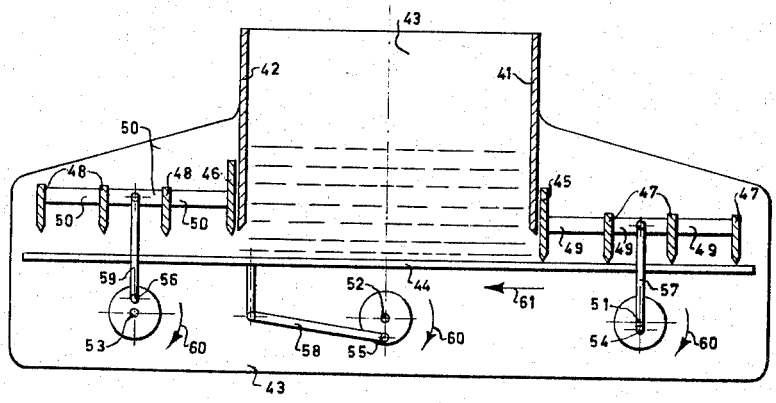
Figure 4:
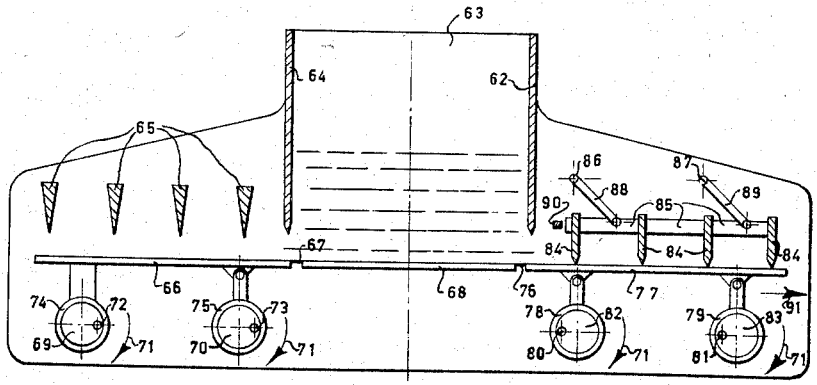
Figure 5:
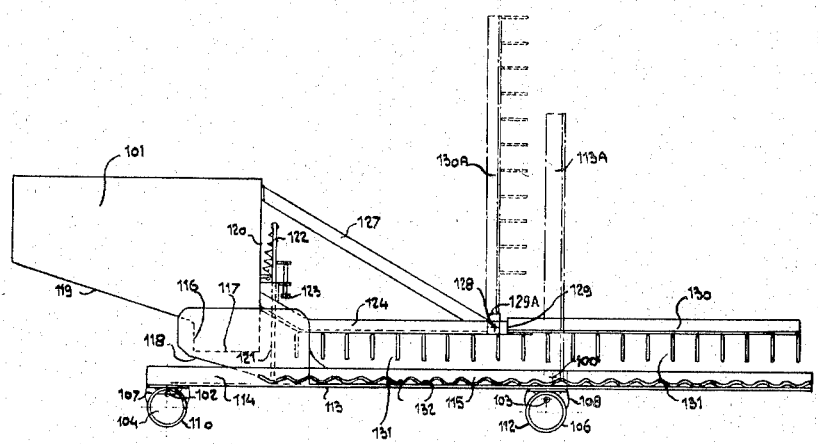
Figure 6:
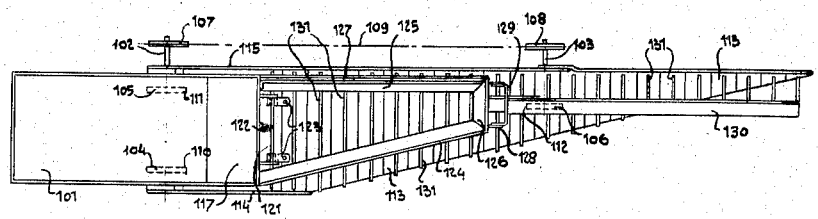
Figure 7:
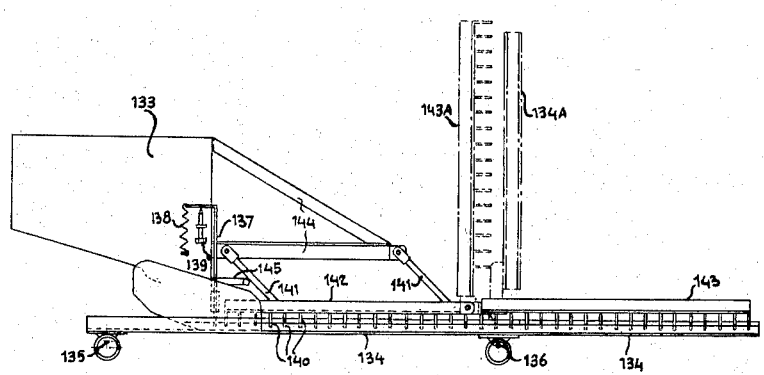
Figure 8:
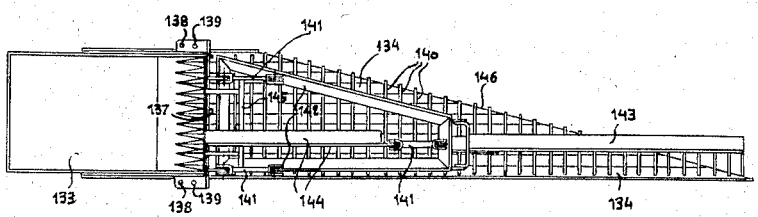

Figs. 3 and 4 show two further embodiments in which a substance delivered from a container is transported through a predetermined distance, Fig. 5 shows a rear view of part of a device according to still another embodiment of the invention, Fig. 6 is a plan view of the device shown in Fig. 5, Fig. 7 is a rear view of part of a device according to a further embodiment, and Fig. 8 is a plan view, partly in section, of the device shown in Fig. 7.

Figure 1:
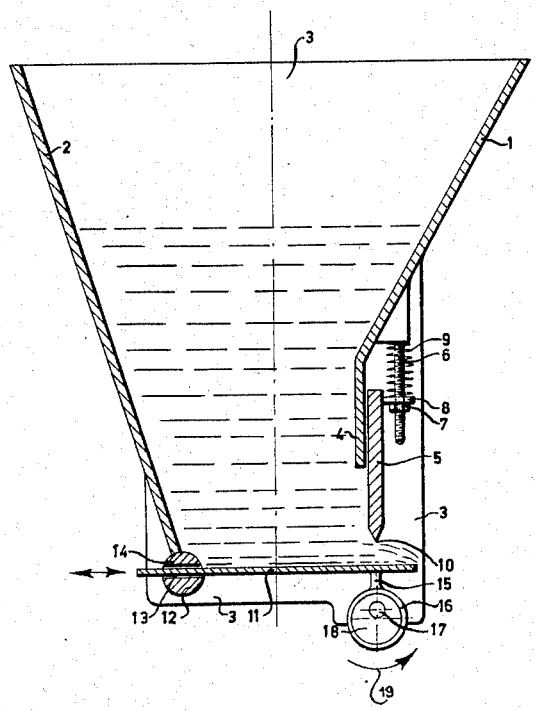
Fig. 1 shows a sectional elevation of a first embodiment of the invention.

In Fig. 1, a container is shown comprising two inclined walls 1 and 2 and two upright walls of which only the wall 3 is visible. The wall 1 extends downwardly as a vertical wall part 4 against which a slide 5 rests, said slide being adjustable to desired height by means of a nut 7 on a threaded rod 6 and carrying an extension 8 of the slide 5. Said slide 5 constitutes the wall of the container below the wall part 4 and is kept in its lowermost position by a spring 9 mounted on the threaded rod 6. The lower edge 10 of the slide is sharpened.

The bottom of the container is formed by a plate 11, the lateral edges of which abut the straight walls, such as the wall 3, of the container. The plate 11 is accommodated in a slot 13 provided in a cylinder 12 so as to be oscillated thereby. The ends of the cylinder 12 are mounted in such a manner that upon rotation of the cylinder by a small angle, the surface of said cylinder remains in contact with the lower edge 14 of the wall 2.

The underside of the plate 11 supports, adjacent the edge 10, an extension 15 connected to an eccentric ring 16 mounted by means of an eccentric disk 18 on an axle 17. Upon rotation of the axle 17 and the disk 18 in direction of the arrow 19, the plate 11 is oscillated or moved back and forth through the slot 13, the part of said plate which is located near the edge 10 performing a reciprocating motion both in vertical and horizontal directions.

These two periodical movements with regard to the edge 10 are so coordinated that at the moment at which the distance between the edge 10 and the plate 11 is greatest, the plate 11 will convey substance outwardly from the container through the opening underneath the edge 10. During the following backward movement the distance between the edge 10 and the plate 11 is so small that the slide 5 prevents the substance, which has been delivered to the outside, from returning again; said substance is thus forced towards the front edge of the plate 11 and will finally drop from its edge.

As long as the container is sufficiently filled, the same quantity of substance will be discharged from the container at each revolution of the axle 17, so that at a constant angular velocity of said axle the substance will be delivered from the container in a substantially constant flow.

The average quantity of material delivered per unit of time is proportional to the angular speed of the axle 17 and also depends on the eccentricity of the disk 18 on said axle. In order to vary the quantity of material delivered per revolution of the axle 17, the eccentricity of the disk 18 can be varied. It may then be also desirable to change the height of the slide 5.

Preferably the slide 5 is always adjusted in such a manner that at each of its periodical movements, the plate 11 will come into contact for a determinable period with the edge 10, in consequence of which an area of the plate 11 will be kept clean and a collection of material which might impede a regular delivery is effectively prevented.

Figure 2:
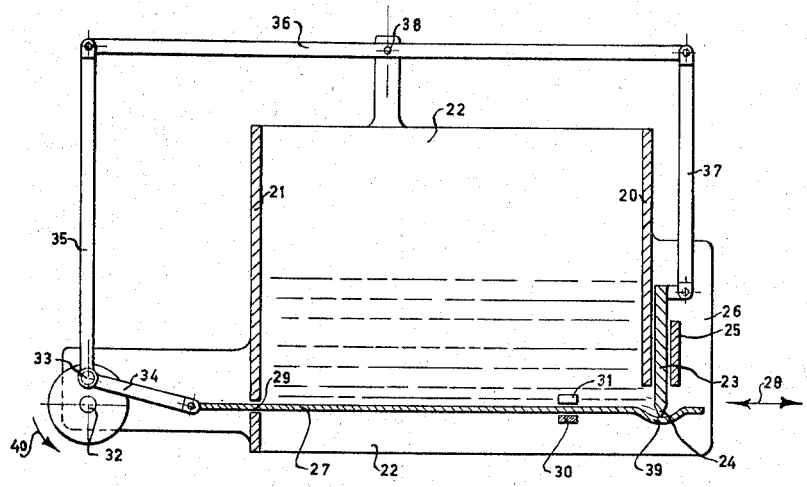
Fig. 2 is a section of a second embodiment.

In the embodiment shown in Fig. 2, a container is provided with two opposite walls 20 and 21 connected together by two further walls, of which only the wall 22 is visible. Adjacent the wall 20 is a slide 23 having a sharp lower edge 24. The slide 23 is guided by the wall 20 and by guides 25 attached to extensions 26 of the wall 22 and by the opposite wall parallel to wall 22. The portion of the slide 23 which extends beyond the lower edge of the wall 20 forms a part of the container wall.

The bottom of the container is formed by a horizontal plate 27 which fits between the wall 22 and the opposite wall and which is adapted to perform a reciprocating movement in the direction of the arrows 28. The plate 27 is moved back and forth through a slot 29 in the wall 21 and is further sustained by a support 30. Upward movement of the plate 27 is prevented by an abutment 31 on the wall 22.

To the plate 27, as well as to the slide 23, a movement is imparted by the rotation of an axle 32 mounted in fixed relation to the container and carrying a crank pin 33. A driving rod 34 is arranged between said crank pin 33 and the plate 27 by which the reciprocating motion of the plate is obtained. By means of a connecting rod 35 a lever 36 and a rod 37, the crank pin 33 simultaneously drives the slide 23, which is consequently moved up and down. The lever 36 is mounted by a central pivot 38 in fixed relation to the container. In the proximity of the slide 23, the plate 27 is provided with a recess or groove 39 having the shape of a portion of a cylinder, the radius of which is equal to the distance between the center line of the crank pin 33 and the center line of the axle 32. The longitudinal axis of the cylinder is parallel to the edge 24.

If the axle 32 is rotated in the direction of the arrow 40, the relative movements of the plate 27 and the slide 23 are substantially the same as those of the corresponding parts in the device of Fig. 1. Due to the recess 39, the edge 24 of the slide 23 is enabled to remain in close proximity to the plate 27 during an appreciable part of a revolution of the axle 32, by which the displacement of the substance over the plate 27 is more effectively secured. It will be understood that, if desired, the device of Fig. 2 may also operate with a plate formed differently near the slide; on the other hand it will be also possible to provide the plate, Fig. 1, with a recess.

In Fig. 3, a container is provided with parallel fixed walls 41 and 42 interconnected by two parallel walls, of which only the wall 43 is visible. The latter walls are substantially extended beyond the container, so as to afford lateral supports for the horizontally reciprocating bottom 44 and two vertically reciprocating slides 45 and 46. Strip-like baffle members 47 and 48 respectively are connected together and to the slides 45 and 46 by means of coupling members 49 and 50 take part in the movement of the slides. For simplicity the guides, by which is assured that the bottom 44 can move only in horizontal direction and that the slides 45 and 46 can only move vertically, are not shown.

The movements of the various elements are derived from three synchronously rotating axles 51, 52 and 53 mounted in fixed bearings and respectively provided with crank pins 54, 55 and 56 which are connected by driving rods 57, 58 and 59 to the coupling members 49, the bottom 44 and the coupling members 50. Due to the relative position of the cranks and the direction of rotation indicated by the arrows 60, the slide 45 is in its lowermost position and the slide 46 in its uppermost position when the bottom is in its central position and is about to move in the direction of the arrow 61. At this moment, the bottom 44 will deliver material from the container in the said direction under the slide 46 and the baffle members 48, said material being prevented from returning with the returning movement of the bottom 44 by said baffle members and said slide. The material is thus forced to the end of the bottom 44 in a practically constant flow. The same action is obtained at the opposite end of the bottom 44, where the slide 45 and the baffle members 47 operate.

In Fig. 4, the container is indicated by its walls 62, 63 and 64. Arranged at the same elevation as the lower edge of the wall 64 are the lower edges of a number of fixed baffle members 65. A plate 66, which is connected by means of an elastic element 67 to the bottom 68 of the container, is moved beneath the wall 64 and the baffle members 65 in such a manner that each point thereof describes a circle. This movement is obtained by means of eccentric disks 69 and 70 mounted on axles 72 and 73 synchronously rotating in the direction of the arrows 71. Around the disk 69 is mounted a ring 74 which is fixedly connected to the plate 66, and the disk 70 carries a ring 75 which is hingedly connected to said plate. Thus, the disk 69 provides for the horizontal movements of the plate 66, while the disks 69 and 70 together provide for its vertical movements. The operation of this part of the device is similar to that of the corresponding part in Fig. 3, since the relative movements of the parts moving with respect to each other are the same.

The bottom 68 is connected by an elastic element 76 to a plate 77. This plate performs horizontal movements which are imparted thereto by the plate 66 and vertical movements which are derived from axles 80 and 81 synchronously rotating with the axles 72 and 73 and carrying eccentric rings 78 and 79, respectively, hingedly connected to the plate 77. The eccentric disks 82 and 83 fixed to the axles 80 and 81 have the same position, so that the plate 77 will be displaced parallel to itself. Above the plate 77 a number of baffle members 84 are connected together by coupling members 85. Two axles 86 and 87 mounted in fixed bearings carry cranks 88 and 89, respectively, of which the crank pins are hingedly connected to the coupling members 85. When the members 85 rest against an abutment 90, the cranks take an inclined position at, for example, an angle of 45°, and the lower edges of the baffle members 84 are located at a lower elevation than the lower edge of the wall 62. Upon upward movement of the plate 77, said plate at a given moment (e.g. after having covered about half the distance in the vertical direction) will reach the lower edges of the baffle members 84. Upon further movement of the plate 77, the baffle members are moved upwardly, but, due to the inclined position of the cranks 88 and 89, this movement is attended by a horizontal movement in the direction of the arrow 91, by which the material on the plate will obtain an additional displacement in the said direction.

The quantity of material, which is delivered from the container at each revolution of the axles 72, 73, 80 and 81, can be varied by varying the eccentricity of the eccentric disks or by adjusting the elevation of the lower edge of the container wall by means of slides. It is preferable to force the slides downwardly by means of springs, by which action the surfaces are kept clean at the slides. Upon upward movement of the container bottom, the slide can then be held in contact with the bottom during a part of said movement. The lowermost position that can be taken by a slide under the influence of a spring or of its own weight should be made adjustable by means of an adjustable abutment.

It will be understood that the bottoms of the devices according to Figs. 3 and 4 can be provided, if desired, with recesses as described with reference to Fig. 2. It is also possible to provide a suitable arrangement, by which the baffle members are adapted to yield individually with regard to the bottom, or by which the bottom is yieldable with regard to the baffle members.

The structure shown in Figs. 5 and 6 is especially intended for fertilizer distribution and comprises a container 101 with a spreading mechanism in accordance with the invention. Two structures of this kind may be mounted together on a vehicular frame, so that a complete movable device is obtained.

According to Figs. 5 and 6, two axles 102 and 103 are mounted below the container 101, the axle 102 being provided with two eccentric disks 104 and 105 and the axle 103 carrying an eccentric disk 106. The axles 102 and 103 are mounted in bearings, not shown, fixedly connected to the walls of the container 101 and are synchronously driven, for example, from one of the wheels supporting the frame. In order to ensure exact synchronism, the axles 102 and 103 are respectively provided with sprocket wheels 107 and 108, said wheels having the same number of teeth and carrying a chain 109 (see Fig. 6).

The disks 104, 105 and 106 respectively, carry eccentric rings 110, 111 and 112 fixed to a rigid plate 113, the periphery of which has in plan view the shape of a rectangular trapezoid. This plate serves as a supporting member for the material to be distributed. The edges of the plate corresponding to the parallel sides of the trapezoid are provided with upright flanges 114 and 115 constituting, locally, side walls 116 of a receptacle open at its front and situated under the downwardly directed outlet 117 of the container 101. The bottom of this receptacle is formed by a small portion of the plate 113 together with a wall 118 which is approximately parallel to the inclined bottom 119 of the container 101. Near the front wall 120 of this container and parallel thereto is arranged a slide 121 which is provided with guides, so as to be able to be moved vertically up and down. A spring 122 tends to move said slide 121 in downward direction, the lowermost position of the slide being defined by adjustable screws 123. The slide 121 has a small clearance with the flanges 114 and 115 of the plate 113. Furthermore, two bars 124 and 125 are secured to the wall 120, said bars being passed over the slide 121, but extending for the remaining part in horizontal direction and being connected together by a cross bar 126. An inclined bar 127 connects the cross bar 126 to the upper end of the container 101. The cross bar 126 carries a hinge with an axis of rotation 128 for a bow 129 to which a bar 130 is connected. The bow 129 and the bar 130 can be placed together in upright position as indicated at 129A and 130A. The bars 124, 125 and 130 carry a plurality of parallel horizontal strips 131 serving as baffle members.

Just beyond the axle 103, the plate 113 is provided with a hinge having an axis 100, by which the narrow end of the plate 113 may be swung into the position 113A, when the bar 130 has been previously swung upwards. For transport, the working width of the complete device may be, therefore, considerably reduced. The operation of the described device is as follows.

When the frame, upon which the device is mounted, is moved forward, the axles 102 and 103 will rotate with an angular velocity which is proportional to the travelling speed. In Fig. 5, the rotation is effected in counterclockwise direction. Each point of the plate 113 describes with regard to the container 101 and the parts which are fixedly connected thereto, such as the baffle members 131, a circle with a radius which is equal to the distance between the center of an eccentric disk and the axis of said disk. Consequently the plate 113, which passes through positions which are all parallel, and the wall 118 will convey, in their lowermost positions, some material from the container 101 along a path beneath the lower edge of the slide 121. This quantity of material will be smaller if the slide 121 is at a lower elevation. Upon the next upward movement of the plate 113, after a length of time which depends on the adjusted lowermost position of the slide 121, said plate 113 will abut against the lower edge of the slide 121, after which the slide will rest for a determinable period upon the plate. Consequently, the next movement of the plate 113 towards the container is not able to convey material, which has been delivered beneath the slide 121, in backward direction so that said material is forced by the slide upon the plate 113 to the right. During the next revolution of the axles 102 and 103, the quantity of material in question is exposed by the baffle member 131, which is nearest to the slide 121, to an action which is similar to that of the slide 121 so that said quantity of material is forced over the plate 113 in the same direction. Although the plate 113 moves and the baffle members 131 are stationary, only the relative movement is important for the displacement of the material over the plate. Assuming for illustrative purposes that the plate 113 stands still, points of the lower edges of the baffle members 131 describe circles in counter-clockwise direction in Fig. 5.

The bottom of the plate 113 is provided with a number of arcuate recesses of which the axial direction is parallel to the lower edges of the baffle members 131. Under each baffle member 131, a recess 132 is so located that the lower edge of the baffle member 131 moves along the bottom of the recess so that said recess is practically swept clean.

It will be understood that with this device, a substantially constant and uniformly distributed flow of material will pass the oblique edge of the plate 113 so that a corresponding area of the ground will be uniformly covered with material.

A variation of the devices of Figs. 5 and 6 is shown in Figs. 7 and 8. According to this embodiment a supporting plate 134 is arranged below the container 133, said plate having in plan view the shape of a rectangular trapezoid and performing the same movement as the plate 113 of Figs. 5 and 6 by means of axles 135 and 136 and the accessory eccentric disks and rings. However, the plate 134 is provided with gutters extending in longitudinal direction of the plate.

A slide 137 movable in vertical direction and similar to the slide 121 is provided at its lower edge with scallops corresponding to the gutters. Springs 138 tend to keep said slide in its lowermost position defined by adjusting screws 139. Moreover, above the plate 134 are provided baffle members 140 in the shape of strips which are transverse to the gutters and which are provided with scallops. Contrary to the baffle members 131 of Figs. 5 and 6, the baffle members 140 are fixed to a frame which is suspended from three inclined hinged arms 141. The frame comprises four bars 142 and said frame has hingedly connected to it a bar 143 in such a manner that said bar is gravitationally maintained in the plane of the frame 142. However, said bar 143 may be placed in vertical position 143A in order to reduce the width of the device during transport. At the same time the narrow end of the plate 134, which remains in working position due to its own weight, may be swung about a hinge in the vertical position 134A.

The three arms 141 are parallel to each other and are of the same length; they are hingeable about axes which are parallel to the axles 135 and 136. The upper hinge points are connected to the container 133 by means of rods 144, whereas the lower hinge points are connected to the frame 142. Consequently the baffle members 140 are able to be displaced in working position in parallel relation to each other by the arc of a circle. The lowermost position of the baffle members is defined by an abutment 145 for one of the arms 141.

The movement of the material over the supporting surface 134 is effected substantially in the same manner as has been already described with reference to the plate 113. However, there is the difference that the plate 134 comes into contact with the lower edges of the baffle members 140 before the plate has reached its uppermost position. Due to the hinged fixation by means of the arms 141, this contact does not prevent forward movement of the plate 134, but the baffle members 140 move upwardly. This movement, however, has a horizontal component which is directed away from the container and the material is forced over the plate by an additional distance. The material in the gutters of the plate 134 is thereby moved forward by extensions of the scalloped lower edges of the baffle members fitting therein. The material finally flows uniformly in downward direction along the oblique edge of the plate 134.

What we claim is:

1. A material dispenser comprising a storage hopper, a bottom movable in said hopper and defining a discharge opening therewith, a slide adjacent said hopper, said slide being movable with respect to the hopper, said slide having an edge extending towards said bottom, and means for oscillating said bottom and said slide so that said edge has a relative motion with respect to a fixed point in the plane of the bottom, which motion describes a closed line.

2. A material dispenser comprising a storage hopper, a bottom movable in said hopper and defining a discharge opening therewith, a slide adjacent said hopper, said slide being movable in a plane fixed with respect to said hopper and substantially normal to said bottom, said slide having an edge extending towards said bottom, and means for oscillating said bottom so that said edge has a relative motion with respect to a fixed point in the plane of said bottom which motion describes a closed line, said means moving said bottom outwardly through said opening past said slide with the spacing intermediate said slide and bottom at a maximum and retracting said bottom through said opening with said spacing at a minimum.

3. A dispenser as claimed in claim 2 comprising sets of linkages coupled respectively to said slide and said bottom, and a common drive for driving said sets, said slide being oscillated in the fixed plane toward and away from said bottom, said bottom being oscillated in a fixed plane substantially normally to the first said fixed plane.

4. A dispenser as claimed in claim 1 wherein said bottom defines, adjacent said discharge opening, a groove substantially parallel with the edge of said slide.

References Cited in the file of this patent

UNITED STATES PATENTS

| | | |
|---|---|---|
| 447,072 | Huntley | Feb. 24, 1891 |
| 522,779 | Carstens et al. | July 10, 1894 |
| 990,395 | Searle | Apr. 25, 1911 |
| 1,551,810 | Draver | Sept. 1, 1925 |
| 1,868,404 | Zeigler | July 19, 1932 |
| 1,880,287 | Sifton | Oct. 4, 1932 |
| 2,338,882 | Todd | Jan. 11, 1944 |

FOREIGN PATENTS

| | | |
|---|---|---|
| 1,010,512 | France | June 12, 1952 |